April 7, 1942.  P. K. FROLICH  2,278,982
PRINTING ROLL
Filed Dec. 30, 1938

Per K. Frolich Inventor
By _____ Attorney

Patented Apr. 7, 1942

2,278,982

UNITED STATES PATENT OFFICE 2,278,982

PRINTING ROLL

Per K. Frolich, Westfield, N. J., assignor to Standard Oil Development Company, a corporation of Delaware Application December 30, 1938, Serial No. 248,528

15 Claims. (Cl. 91—67.8)

This invention relates to printing machinery and relates particularly to a new and useful form of inking rolls, backing rolls, transfer blanket and type.

In prior printing machinery, difficulty has been encountered in producing soft structures for such purposes as inking rolls, transfer blanket rolls, backing rolls and soft type. For printing rolls it has been customary to use either glycerine and gelatin composition, or rubber, and substantially rubber only has been used for transfer blankets and soft type. Neither of these materials have, however, proven satisfactory. Glycerine and gelatin ink rolls are susceptible to change in size with change in humidity of surrounding atmosphere, and they cannot be cleaned with soap and water, but only with a limited range of organic solvents. Rubber rolls, on the other hand, are very susceptible to harm from the volatile solvents, and accordingly they are difficult to clean, and the solvents used in the ink which they spread are undesirably limited. Furthermore, neither type of inking roll has a very good resistance to abrasion and flexure, and neither type of roll has a satisfactorily high physical strength. This is especially true with transfer blankets, which have a relatively short life from the wear and abrasion which occurs, and also because of oxidation and other chemical changes which occur because of the presence of oxygen at elevated temperatures in contact with the blanket.

The present invention provides a new type of inking roll, backing roll, transfer blanket, etc., in which a polymer substance produced from isobutylene and butadiene provides a very greatly superior resistance to abrasion, flexure, wear and other damage, and in addition provides a new and very useful resistance to the presence of solvents, thereby permitting a much wider range of solvents in the ink. Furthermore, the material is very highly resistant to oxidation and to other deteriorating influences, and accordingly where the ordinary rubber or glycerine-gelatin inking rolls must be renewed after every few weeks or months of service, an inking roll according to this invention has greater durability; that is, its lasting qualities are materially enhanced; and in addition it has a high resistance to the volatile solvents such as to permit the use in printing ink of the oils and volatile oxygenated solvents or ethylene dichloride which are fatal to the usefulness of rubber inking rolls, and at the same time permit of the use of soap and water for the cleaning of the rolls.

Figure 1:
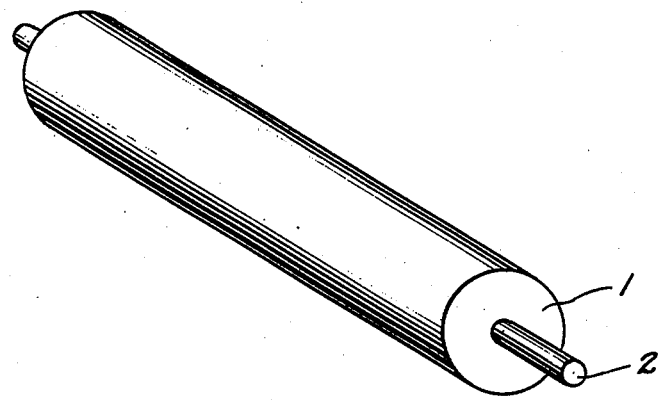
Figure 2:
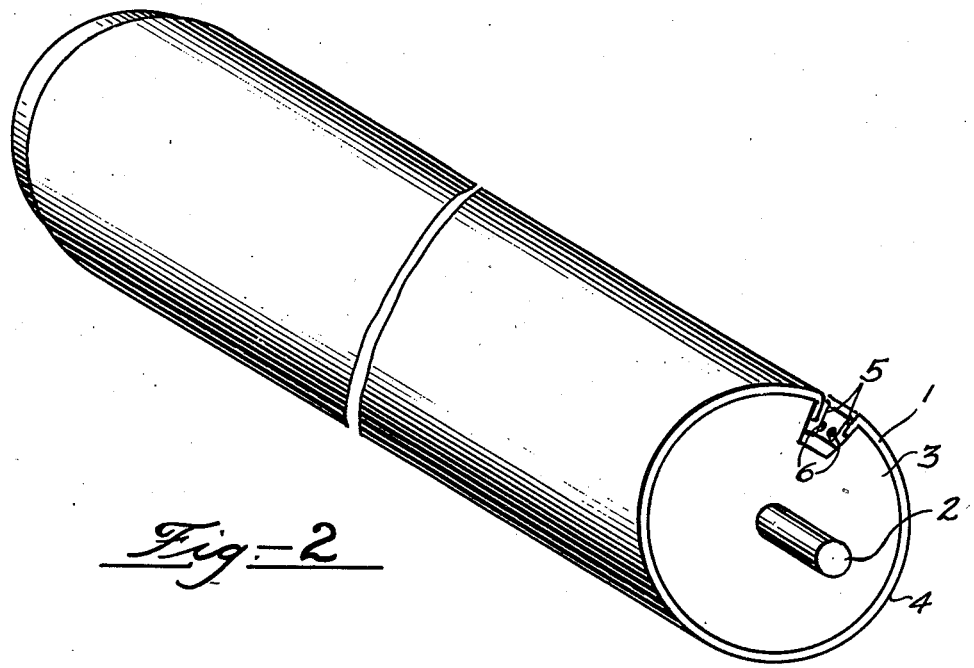

Thus an object of the invention is to improve the toughness, durability and efficiency of printing roller and transfer blanket equipment. Other objects and details of the invention will be apparent from the following description when read in connection with the accompanying figures wherein Fig. 1 is an ink roller according to the invention and Fig. 2 is a transfer blanket according to the invention.

The basic material of the invention is produced from a mixture of olefins and diolefins. In the oil cracking industry, considerable quantities of isobutylene and butadiene are produced. These gases are purified and mixed in the proportion of 70–90 parts of isobutylene with 30–10 parts of butadiene and treated at a low temperature ranging from -50° C. to -180° C. with a catalyst which in the preferred form is a solution of aluminum chloride in methyl chloride prepared according to the disclosure in application Serial No. 182,252 filed by Thomas and Sparks.

The mixture of olefinic substances polymerizes very rapidly in the presence of the catalyst to a plastic solid. The mixture may be warmed to room temperature and the catalyst, solvents and diluents removed, leaving a residue which is a clear white solid having a substantial elongation and flexibility together with a considerable elasticity.

This material as so prepared is a predominantly saturated, linear chain hydrocarbon resulting from the interpolymerization of the isobutylene and butadiene. In this form as first prepared, it is strongly resistant to acids and alkalis and soluble only in hydrocarbon liquids and certain chlorinated hydrocarbon liquids, and is substantially insoluble in all of the oxygenated and other common solvents. Furthermore, it is incompatible with and shows no tendency to mix with, absorb or dissolve in any of the ordinary varnish and ink resins or solvents.

The material, in spite of its high chemical inactivity, will combine with small proportions of sulfur in a sulfurization reaction which substantially improves the characteristics of the material.

For this purpose the original polymer may be compounded according to the following formula:

| | Parts |
|---|---|
| 20% butadiene ⎫ copolymer | 100 |
| 80% isobutylene ⎭ | |
| Blanc fixe | 50 |
| Zinc oxide | 25 |
| Titanium dioxide | 25 |
| Sulfur | 5 |
| Stearic acid | 5 |
| Altax (benzol thiazyl disulfide) | 3 |
| Tuads (tetra methyl thiuram disulfide) | 1 |

It will be observed that approximately 5% of sulfur is incorporated into the mixture, which is sufficient or more than sufficient to saturate completely all of the double bonds remaining in the molecules after the polymerization reaction. It is to be further observed that the material as so sulfurized to chemical saturation is outstandingly different from rubber since rubber when vulcanized to saturation becomes hard rubber and entirely loses its plasticity, elasticity and elongation. In sharp contrast to this reaction of rubber, the polymer substance has its elongation increased by the addition of sulfur and likewise the elasticity and elastic limit as well as the ultimate tensile strength are substantially increased without the development of any tendency toward brittleness. Prior to the sulfurization reaction the material has sufficient thermoplasticity to permit the compounded material to be moulded into the desired shape. When so moulded it is desirably heated to a temperature of about 160° C. for a period of about 4 hours to complete the sulfurization reaction and to develop the maximum strength, elasticity, etc.

In the above formula the butadiene and isobutylene are mixed before polymerizing and are desirably in substantially pure condition when mixed. The polymerization reaction requires the presence of aluminum chloride dissolved preferably in methyl chloride but the catalyst, the methyl chloride and any refrigerant such as liquefied ethylene, etc., are removed at the close of the polymerization reaction. The blank fixe and zinc oxide are used as fillers to give the desired body to the compound. The titanium oxide also serves to improve the body somewhat and because of its whiteness and high opacity it gives a desirable white color to the compound. The sulfur is present for the purpose of combining with the polymerized olefinic materials to improve the strength and wear resistance of the compound and also to develop an elastic limit and to avoid any tendency toward cold flow. The stearic acid is present for the purpose of still further increasing the desirable characteristics of the compound; and the Alltax and Tuads are present to further the combination between the sulfur and the polymer material. The stearic acid or other vegetable oils or aliphatic acid esters also serve to reduce somewhat the elasticity of the composition in order to produce a very soft, yielding surface which is particularly advantageous for taking up and distributing the ink.

Thus the material as compounded with sulfur and with the fillers indicated may be moulded into the desired form; for an ink roller, the compounded polymer material 1 may be formed around a metal axle 2 within a suitable mould, and if desired it may be heated while within the mould to the desired sulfurizing temperature.

When the sulfurization treatment is completed, the roll is wholly resistant to solvents such as oxygenated liquids or ethylene dichloride and is resistant to acids and alkalis of any character and resistant to all of the gums and resins commonly used for printing inks. Furthermore, it has a resistance to flexure greatly superior to rubber; that is, the best rubber compound available, when tested in the DeMattia flexometer, fails after from 500,000 to 750,000 flexures, whereas compounded and sulfurized polymer substance does not fail after 5,000,000 to 6,000,000 flexures. Similarly, it is very resistant to abrasion. When a representative sample is tested on the duPont abrader in comparison to rubber, the rubber shows an abrasion loss of 289 cc. per horse-power hour whereas the polymer substance shows a loss of only 218 cc. per horse-power hour, thereby showing a very satisfactory resistance to abrasion and wear.

The material is similarly usable for ink transfer rolls, for offset blankets and for rubber printing type or printing blocks generally as is particularly well shown in Figure 2, where the axle 1 carries a core member 3 around which the offset blanket 4 is wrapped and held in place by clamp members 5 under the compressive effect of bolt members 6.

Similarly, the material is conveniently usable for the production of soft type. For this use the material is desirably compounded with a considerably greater quantity of filler material, sufficient to produce a much stiffer compound. It is then moulded in matrices of the desired type, either single type, pre-set lines, or whole pages such as may be produced from a stereotype matrix. The polymer material is pressed firmly into the interstices of the matrices and heated for the above indicated time and temperature to complete the sulfurization reaction.

Alternatively, the material may be compounded according to the following formula:

|  | Parts |
| --- | --- |
| 20% butadiene } copolymer | 40 |
| 80% isobutylene } | |
| Blanc fixe | 25 |
| Zinc oxide | 25 |
| Stearic acid | 5 |
| Sulfur | 2 |
| Altax (benzol thiazyl disulfide) | 3 |
| Tuads (tetra methyl thiuram disulfide) | 1 |

The blanc fixe and zinc oxide are used as a filler to give the composition the required body. The Altax and Tuads are employed as sulfurization aids, and the sulfur as the sulfurizing agent. Softeners, such as stearic acid, vegetable oils, aliphatic fatty acid esters, etc., are employed to deaden the elasticity of the composition in order to produce a soft, yielding surface necessary to take up and distribute the ink.

This new polymer has unusual properties in being free from a spongy or cellular nature, and possesses a soft, yielding surface with the required suction to take up ink and distribute it evenly over the type. These rollers can be cleaned either with soap and water or with solvents such as oxygenated solvents, e. g., acetone, ethyl alcohol, amyl acetate, etc., and ethylene dichloride (distinction and advantage over rubber). These polymer compositions are not affected by changes in temperature. These rollers are also particularly desirable for inks containing oxygenated liquids or solvents such as ethylene dichloride which have a very deleterious action on rollers now being used for this purpose.

Thus the structure of the invention consists of a member adapted to contact with type or paper in a printing operation composed of a compounded and sulfurized polymer made up of isobutylene and butadiene in a polymer having a molecular weight ranging from 50,000 to 250,000 or more.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. An ink roller comprising a body of sulfurized isobutylene-butadiene polymer material.

2. An ink roller comprising a body of sulfurized isobutylene-butadiene polymer material and compounding and filler materials therein.

3. An offset printing blanket comprising a body of sulfurized polymer comprising isobutylene and butadiene.

4. A composition for printers' inking rollers comprising a sulfurized copolymer of a lower olefin with a low molecular weight diolefin and with compounding and filler materials therein.

5. An ink roller comprising a body of sulfurized isobutylene-butadiene polymer material and compounding and filler materials therein comprising sulfur.

6. An ink roller comprising a body of sulfurized isobutylene-butadiene polymer material and compounding and filler materials therein comprising chemically combined sulfur.

7. An ink roller comprising a body of sulfurized isobutylene-butadiene polymer material and compounding and filler materials therein comprising sulfur and inert material.

8. An ink roller comprising a body of sulfurized isobutylene-butadiene polymer material and compounding and filler materials therein comprising sulfur, sulfur-containing compounds and inert pigments.

9. An ink roller comprising a body of sulfurized isobutylene-butadiene polymer material and compounding and filler materials therein comprising sulfur, sulfur-containing compounds, inert pigments, and oily materials adapted to soften the compound.

10. An ink carrier comprising a solid core member and a surface layer of soft ink-carrying material comprising a polymer formed from a mixture of isobutylene and butadiene polymerized at low temperature into a high molecular weight, nearly saturated, linear chain hydrocarbon compound together with filler substances.

11. An ink carrier comprising a solid core member and a surface layer of soft ink-carrying material comprising a polymer formed from a mixture of isobutylene and butadiene polymerized at low temperature into a high molecular weight, nearly saturated, linear chain hydrocarbon compound together with filler substances comprising sulfur and sulfur compounds.

12. An ink carrier comprising a solid core member and a surface layer of soft ink-carrying material comprising a polymer formed from a mixture of isobutylene and butadiene polymerized at low temperature into a high molecular weight, nearly saturated, linear chain hydrocarbon compound together with filler substances comprising sulfur, sulfur compounds and inert filler material.

13. An ink carrier comprising a solid core member and a surface layer of soft ink-carrying material comprising a polymer formed from a mixture of isobutylene and butadiene polymerized at low temperature into a high molecular weight, nearly saturated, linear chain hydrocarbon compound together with filler substances comprising sulfur, sulfur compounds, inert filler material and oily softener substances.

14. An ink carrier comprising a solid core member and a surface layer of soft ink-carrying material comprising a polymer formed from a mixture of isobutylene and butadiene in the proportion of isobutylene 70 to 90 parts with butadiene 30 to 10 parts, polymerized by the aid of a catalyst comprising aluminum chloride dissolved in an alkyl halide at low temperature into a high molecular weight, nearly saturated, linear chain hydrocarbon compound together with filler substances.

15. An ink carrier comprising a solid core member and a surface layer of soft ink-carrying material comprising a polymer formed from a mixture of isobutylene and butadiene in the proportion of isobutylene 70 to 90 parts with butadiene 30 to 10 parts, polymerized by the aid of a catalyst comprising aluminum chloride dissolved in an alkyl halide at low temperature into a high molecular weight, nearly saturated, linear chain hydrocarbon compound together with filler substances comprising sulfur, sulfur compounds, inert filler material and oily softener substances.

PER K. FROLICH.